Figure 1:
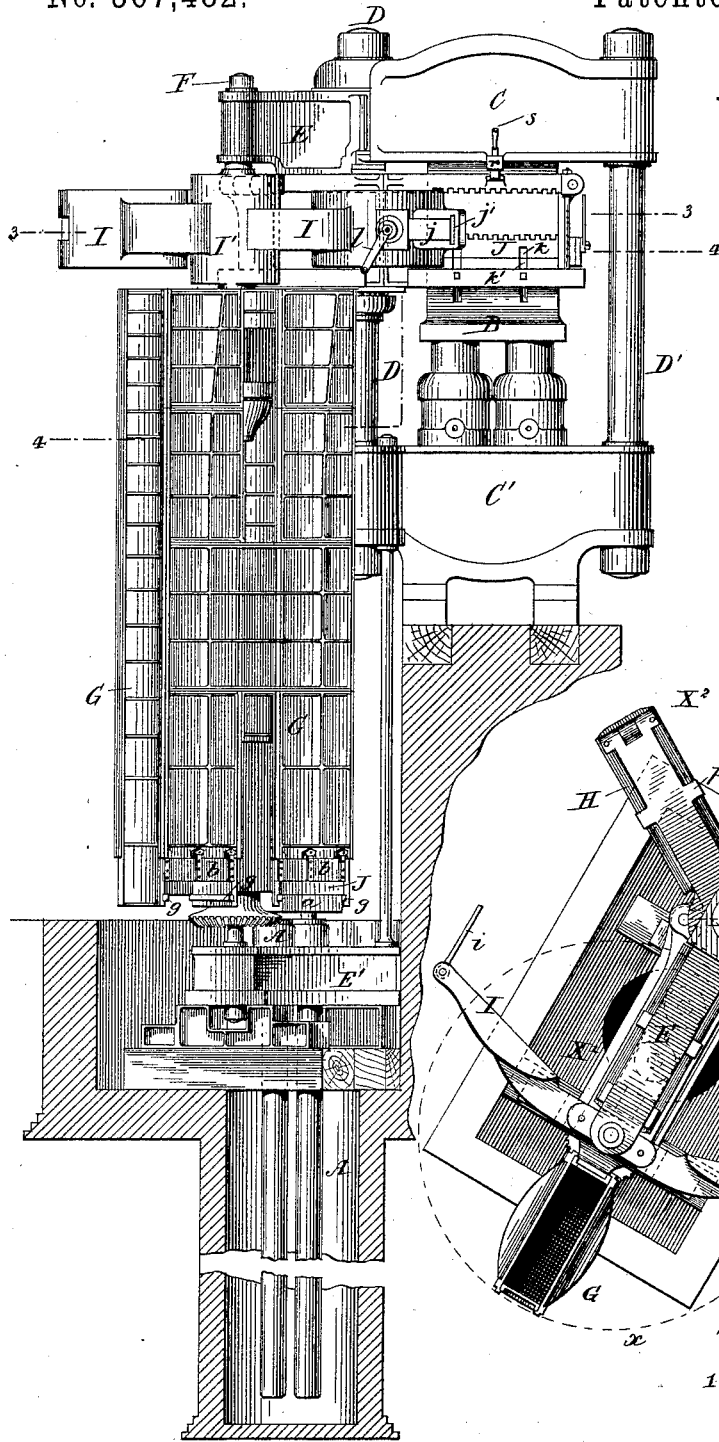

(No Model.) 3 Sheets—Sheet 1.

J. WATSON.
BALING PRESS.

No. 367,482. Patented Aug. 2, 1887.

WITNESSES:
John A. Rennie,
M. S. Powers.

INVENTOR:
James Watson,
By his Attorneys,
Arthur C. Fraser & Co.

(No Model.) 3 Sheets—Sheet 2.

J. WATSON.
BALING PRESS.

No. 367,482. Patented Aug. 2, 1887.

WITNESSES:
John A. Rennie
M. S. Powers.

INVENTOR:
James Watson,
By his Attorneys,
Arthur E. Brasser & Co.

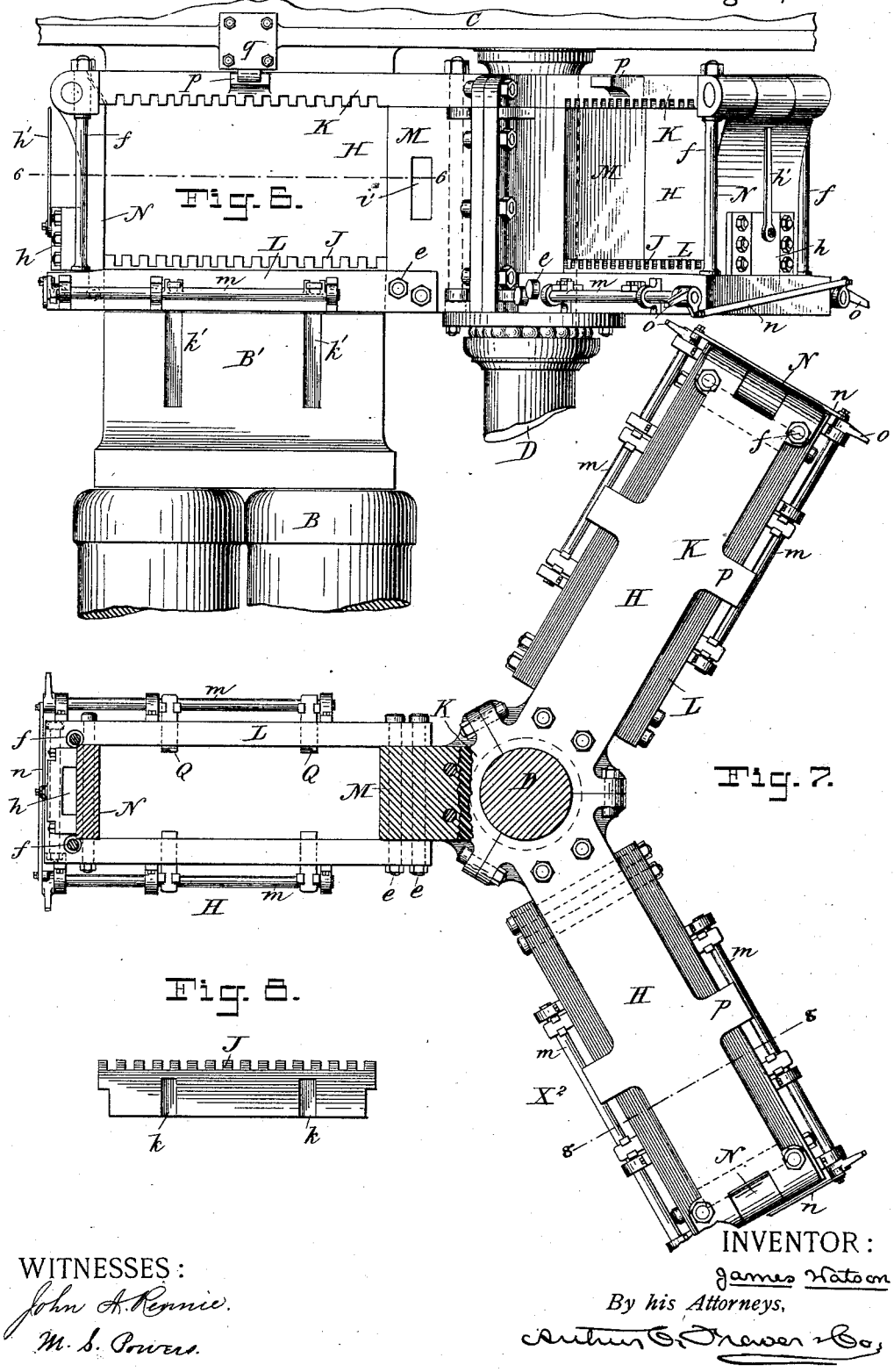

UNITED STATES PATENT OFFICE.

JAMES WATSON, OF LONDON, ENGLAND.

BALING-PRESS.

SPECIFICATION forming part of Letters Patent No. 367,482, dated August 2, 1887.

Application filed May 13, 1887. Serial No. 238,083. (No model.)

*To all whom it may concern:*

Be it known that I, JAMES WATSON, a British subject, residing at London, England, have invented certain new and useful Improvements in Baling-Presses, of which the following is a specification.

This invention relates to baling-presses of that class wherein the cotton, jute, or other material to be formed into a bale receives, first, the preliminary pressure by one or more rams, and then a final or finishing pressure by one or more other rams.

In my United States Patent No. 283,838, dated August 28, 1883, is shown a baling-press of the same general character as that to which my present invention pertains. The press is constructed with two sets of pressing-boxes, each set being mounted to rotate upon a vertical axis. One set consists of deep boxes, each capable of holding sufficient of the bulky or loose material to form a bale. The other set consists of shallow boxes the depth of each of which is sufficient to hold the material after the preliminary pressure. The cotton or other material is filled into one of the deep boxes. The set of deep boxes is then rotated until this box comes over the long-stroke or preparatory ram. This ram then rises and forces the material up through the deep box and out at the top thereof into one of the shallow boxes, which stands directly over the deep box. The sides of the shallow boxes are formed of hinged doors which are kept closed during this operation. Sliding toothed stops or grids carried by the doors are thrust under the bottom of the compressed material, whereupon the preparatory rams descend, leaving the material held in the shallow box. The set of shallow boxes is then revolved, thereby bringing the box containing the material over the final or finishing ram, which is then raised enough to relieve the sliding grids from the pressure of the material. The grids are then slid out, the side doors of the shallow box are opened, and the finishing-ram then rises farther to give the final pressure to the bale, whereupon the bale is lashed or hooped, the finishing-ram run down, and the bale tumbled out. In my said patent the set of shallow boxes consists of two boxes rigidly connected together. Each of the boxes consists of a rigid top plate or top lashing-plate, a fixed plate at the inner or pivotal end, a pivoted easing door at the outer end, and the two side doors, the latter forming the sides of the boxes and being hinged to them and carried around with them. With boxes of this construction it was impossible to lash the bale until after it had been carried over the finishing-ram and received its final pressure.

In my United States Patent No. 294,551, dated March 4, 1884, is shown another press of the same general character, wherein two sets of deep boxes and two long-stroke or preparatory rams are used with one finishing-ram or pair of rams for giving the final pressure to the bales prepared in the two sets of deep boxes. There are two shallow boxes, each being independent of the other, and the two being pivoted on different axes. The side doors, instead of being hinged to the shallow boxes and carried around with them, are hinged on stationary axes. The shallow boxes, instead of being bottomless, as before, are constructed with a bottom plate or open frame, the opening in which is of the same size as the interior of the deep boxes in plan, and the top plate and bottom frame are united at the outer end of the box by means of the end easing-door, which is hinged to the top plate and hooks under the bottom frame. The cotton or other material, having been filled into one of the deep boxes, and that box having been brought over the long-stroke ram, and the shallow box having been brought over it, the ascent of the ram forces the material up into the shallow box. The side doors are then thrown open and the partly-pressed bale is lashed, after which the ram descends and the bale expands against the bottom frame of the box, the inner edges of which hold it. The shallow box is then swung round over the final ram, (or pair of rams,) which then ascends and gives the bale its final pressure, whereupon the lashings are drawn tight and fastened, the ram is lowered, and the bale is tumbled out. With this construction the greater part of the lashing of the bale was performed before the bale was swung over the finishing-ram, thus avoiding the waste of time involved in lashing the bale entirely while it is held by the finishing-ram, and consequently enabling the finishing-ram to press more bales in a given time. It was necessary, however, that the bale should be held compressed by the preparatory ram while being lashed, so that during this time this ram was necessarily inactive. In the practical operation of baling-presses of this character the greatest economy and speed are attained when all the different co-operative parts of the apparatus work alike to their full capacity. In the press shown in my said 1883 patent the capacity of the preparatory boxes and rams was greater than that of the finishing-ram, since the operation of the latter was hampered by the necessity for holding it idle during the operations of withdrawing the grids, throwing open the doors, and passing the lashings around the bale. In my said 1884 patent the capacity of the finishing-rams is greatly increased, since the operations of opening the doors and passing the lashings around the bale are performed before the bale reaches the finishing-rams; but since these operations were simply transferred to the preparatory rams there would have been no material saving of time except for the duplication of the preparatory boxes and rams, so that in two sets of boxes the bales were being prepared for the action of the finishing-rams. It has been found, however, that the finishing-rams have a capacity for giving the final pressure to more bales than can be prepared by the preparatory rams in the construction of press shown in that patent.

My present invention aims to still further increase the capacity of the press. To this end I provide means whereby the partly-compressed bale may be lashed after being released from the pressure of the preparatory rams and before being swung over the finishing-rams. Thus as soon as the preparatory ram has pressed the material into the shallow box the side doors may be at once opened, the bale partially lashed, and the shallow box swung out, thereby leaving the preparatory ram free, so that it may be utilized in preparing the next successive bale.

According to the preferred construction of my invention I make the press double, as in my said 1884 patent—that is, I employ two sets of deep boxes and two preparatory rams to one finishing-ram or pair of rams; but instead of having only two shallow boxes, one to each set of deep boxes, as in my said patent, I now provide four (or more) shallow boxes, two to each set of deep boxes, and I mount these shallow boxes in such manner that they may be turned to a great extent independently of one another. The two boxes of one pair are both pivoted upon the same axis, as in my said 1883 patent; but instead of being rigid, as in that construction, they are independent, so that while either one is held in one position the other may be turned for half a revolution (more or less). Thus one of the four shallow boxes may be over one of the preparatory rams, the other one of the same pair may be swung out at right angles, the third box (of the opposite pair) may be over the finishing-rams, and the fourth box may be over the other preparatory ram, so that during the greater portion of the time all of the four shallow boxes are in use, and both the preparatory and finishing rams are enabled to work in quick succession, thus utilizing them to their full capacity, and rendering the action of the pumps which supply water for the several rams practically continuous.

According to my present invention the construction of the shallow boxes is materially changed, in order to admit of lashing the partly-formed bale after it has been released from the preparatory ram. To this end I employ, in general, the same construction of box as in my said 1884 patent, and I provide the box with means for locking to it a movable follower or bottom lashing-plate, which is forced up into it from one of the deep boxes. In my said patent the deep boxes were provided with movable followers or lashing-plates, which during the act of filling the deep boxes were held at the bottoms thereof, and constituted false bottoms therefor, and which during the preliminary pressing were lifted by the long-stroke rams, and again descended with the followers of said rams when the preparatory pressing was accomplished. According to my present invention I provide for forcing these movable followers or lashing-plates up into the shallow boxes and for locking them there, so that the long-stroke ram may immediately fall back, in order to permit the shallow box to be swung out, thus leaving the partly-formed bale held compressed in the shallow box between the top lashing-plate thereof and the movable follower or bottom lashing-plate, which constitutes a false bottom for the shallow box. Since the shallow box carries no side doors with it, or, in other words, has both its sides open, the lashing may be effected at any time after the preliminary ram has released it, and either before or after it is swung out. The movable followers or bottom lashing-plates circulate from the deep boxes into the shallow boxes and back again into the deep boxes, each one passing from one of the deep boxes into one of the shallow boxes, and, after the completed bale has been tumbled out, being carried around in the empty shallow box and brought again over one of the deep boxes, but over a different one from which it came, and being then lowered thereinto by the descent of the long-stroke ram.

My invention also pertains to the mechanical construction of the shallow boxes in two respects: first, to increase their strength, and, second, to adapt the press to press bales of different sizes.

I will now proceed to describe in detail the preferred construction of a press according to my present invention, with reference to the accompanying drawings, wherein—

Figure 2:
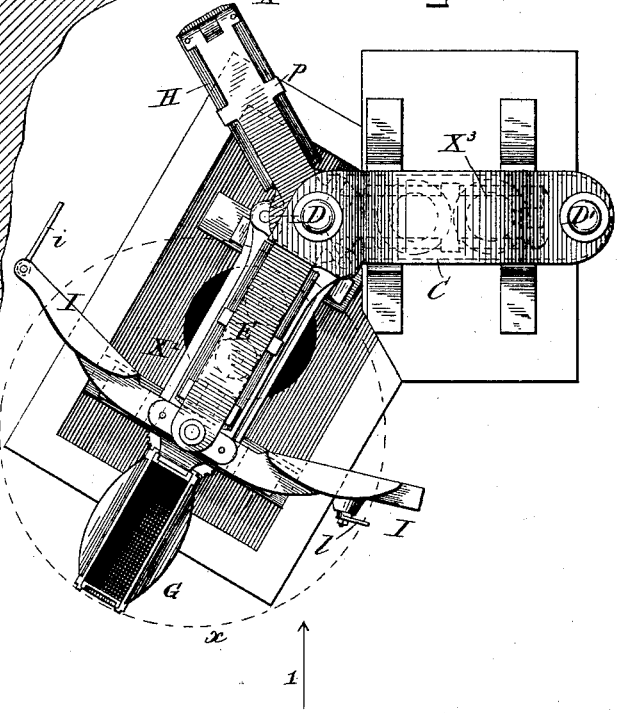
Figure 3:
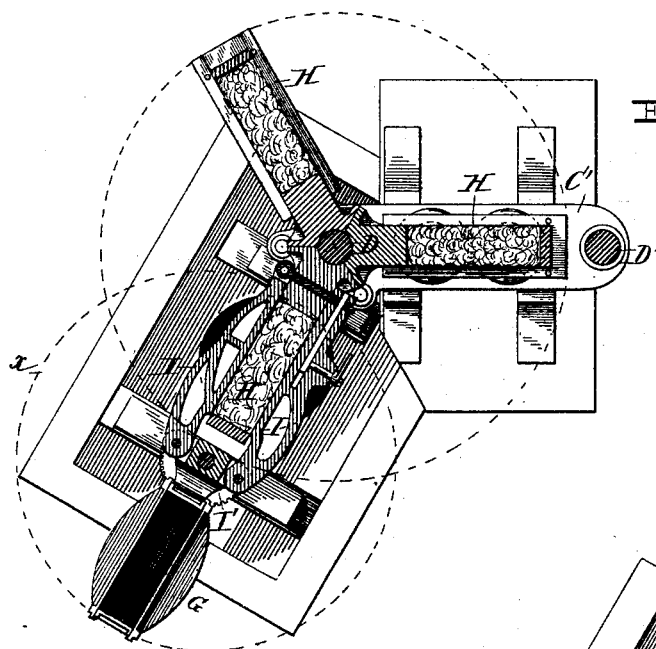
Figure 4:
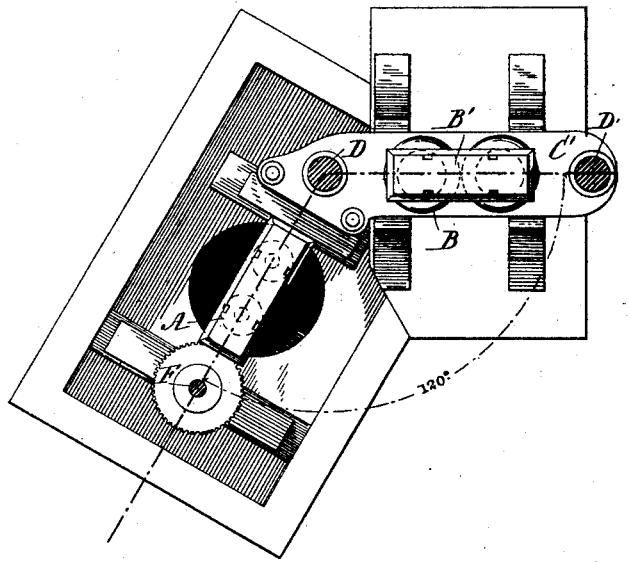
Figure 5:
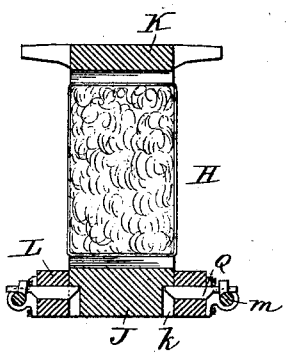

Figure 1 is a front elevation of the press, the foundations thereof being in section, and the long-stroke boxes on one side being also in section. Fig. 2 is a plan view of the press shown in Fig. 1. The remaining views are on a larger scale. Fig. 3 is a side elevation of the two shallow boxes of one set, the view being partly broken away in mid-section to show the manner of pivoting the boxes. Fig. 4 is a plan view on a still larger scale than Fig. 3, showing one of the shallow boxes. Fig. 5 is a similar plan, showing the bottom plate or frame of one of the shallow boxes. Fig. 6 is a vertical transverse section in the plane of the lines 6 6 in Figs. 3, 4, and 5, showing the shallow box in its first position over the deep box and ready for the cotton or other material to be forced up into it. Fig. 7 is a similar transverse section in the same plane as Fig. 6, showing the shallow box in its second position swung out at right angles and in readiness to pass the lashings around the partly-formed bale. Fig. 8 is a similar section, also in the same plane as Fig. 6, showing the shallow box in its third position over the finishing-rams, and showing the bale fully compressed thereby. Fig. 9 is another similar transverse section, showing the parts in the same position as Fig. 8, except that a heavier bale is being formed. Fig. 10 is an end elevation of one of the shallow boxes, showing the end easing-door. Fig. 11 is a side elevation of one of the movable followers or bottom lashing-plates; and Fig. 12 is a side elevation, on the same scale as Fig. 3, showing a slightly modified construction of the shallow boxes.

Referring first to Fig. 1, let A and A' designate the long-stroke or preparatory presses or rams, $a$ and $a'$ the respective followers or platens thereof, B the short stroke or finishing press or ram or pair of rams, and B' the follower or platen thereof. Each of the presses A, A', and B may have one, two, or more rams or plungers, as may be preferred.

Let C designate the head of the press, which is united to the lower cross-head, C', of the short-stroke rams by columns D D', and to the cross-heads E E' of the long stroke rams by columns F F'.

G G are the deep or preparatory boxes of one set, being connected rigidly together and pivoted on the column F, and G' G' are the two like boxes of the other set, which in like manner are pivoted on the column F'.

H H H H are the four shallow boxes, which for convenience I will refer to, respectively, as H', H², H³, and H⁴, the two former being of the right-hand pair and co-operating with the deep boxes G G and long-stroke ram A, and the two latter being of the left-hand pair and co-operating with the deep boxes G' G' and long-stroke ram A'. The boxes of the right-hand pair are pivoted on the column D and those of the left-hand pair on the column D'.

I I are the two side doors for the shallow boxes of the right-hand pair and I' I' are the doors for those of the left-hand pair. The doors I I are hinged to a fixed frame, which is mounted on the column F, and the doors I' I' are hinged to a fixed frame on the column F'. The construction of these doors is the same as in my said 1884 patent. One of the doors of each set has a hasp, $i$, at its outer end, which, when it is closed, projects through a hole, $i'$, in one of the shallow boxes, and a locking-bolt, $j$, borne by the other door, is passed through a hole in its end, thus fastening the two doors securely in their closed position. Any other suitable means of fastening for the doors may be applied.

J J are the loose followers or bottom lashing-plates, of which there are six. One of them is shown detached in Fig. 11. These followers form a free fit with the interiors of the deep boxes, so that they may freely ascend or descend therein. The deep boxes have ledges $g\ g$ at their bottom ends, which arrest these followers and retain them therein as false bottoms. The deep boxes are provided with doors $b\ b$, opening just above the top of these false bottoms, for the purpose of enabling the baling-cloth to be laid on the latter before filling in the material to be baled.

I will now describe the construction of the shallow boxes with reference particularly to Figs. 3 to 10.

Each box consists of a top plate, K, (shown in plan in Fig. 4,) of a bottom frame, L, (shown in plan in Fig. 5,) of an inner end plate, M, (best shown in Fig. 3,) and of an easing-door, N, (best shown in Figs. 3 and 10,) at its outer end. The sides of the box are open, being closed by the doors I I, (or I' I',) as shown in Fig. 6, during the preparatory pressing, but being open at all other times. The top and bottom plates, K and L, of each box are extended on the side of the pivotal axis and embrace the column D or D', on which the box is pivoted. In order to enable them to be applied around the column, these plates are made in halves, divided longitudinally, and drawn together by bolts, as indicated in Figs. 4 and 5. To reduce the friction at the pivots roller-bearings are employed, as clearly shown in Fig. 3, and the weight of the box is borne by a flange or collar, $c$, through the medium of anti-friction balls or rollers $d\ d$. The plates K L of the two boxes of one set are made to alternate where they engage the column, in the manner shown in Fig. 3, the pivotal ends of the plates of one box coming beneath those of the other, so that the two boxes are hung independently of one another, in order that in their revolution neither shall interfere with the other's movement. The top and bottom plates, K and L, of each box are tied together through the medium of the plate M at the inner end, and of tie-bolts $e\ e$, passing through the same longitudinally, and at the outer end through the medium of tie-bolts $f\ f$, so that the spreading apart of the two plates under the pressure of the bale is avoided. In my said 1884 patent the lower plate or frame was tied to the upper plate at its outer end only through the medium of the end easing-door, the lower part of which hooked under the outer end of the lower plate. That construction involved a difficult and expensive forging for the end easing-door, and a complicated fitting of the end thereof to the outer end of the lower plate, and, furthermore, did not provide as rigid a connection at the outer end of the box as is desirable for the resisting of both the direct and torsional strains to which the boxes are subjected in use. The construction herein shown obviates these disadvantages, in that it greatly simplifies the connection of the easing-door and lower plate, and ties the upper and lower plates together in permanent, substantial, and rigid manner.

The easing-door N is hinged to the outer end of the upper plate, K, as before, extends thence downward between the two tie-bolts $ff$, and terminates on top of the lower plate, L, to which it is fastened by a bolt, $h$, which is applied by a lever, $h'$, the latter moving the bolt through the medium of an eccentric, as shown in dotted lines in Fig. 10, or in any other convenient manner.

In each box is a top lashing-plate, P, grooved on its under side to admit the lashings. This plate P may be identical with the top plate, K, or may, as in the construction shown in Figs. 3 to 10, be a separate plate mounted beneath the top plate, in a manner which I will describe presently.

The bottom plate or frame, L, is provided with some suitable construction of locking apparatus by which to lock the loose follower J to the shallow box when the preparatory ram has raised it thereinto. The construction of locking mechanism shown consists of four bolts, (more or less,) Q Q, two on each side, the operation of which will best be understood from an examination of Fig. 7. The loose follower J has two recesses, $k\ k$, on its opposite sides, (see Fig. 11,) corresponding in position to the bolts Q Q. In Fig. 6 the bolts are shown withdrawn. When the follower J has been forced up, the bolts are moved in and enter its recesses $k\ k$, as shown in Fig. 7. The bolts are operated simultaneously through the medium of two rock-shafts, $m\ m$, on opposite sides, which have radial arms entering notches in the bolts. The two shafts are caused to turn together in opposite directions by means of a link or bar, $n$, which extends across the outer end of the box, as shown in Fig. 10, and is coupled to an upwardly-projecting crank on one shaft $m$ and to a downwardly-projecting crank on the other. Levers $n'\ n'$ are formed on the respective shafts, by means of which the workmen may thrust in or withdraw the bolts.

The follower B' of the finishing-ram is formed with two vertical grooves, $k'\ k'$, on each side, corresponding in position with the recesses $k\ k$ and bolts Q Q. This is in order that when the follower B' rises to give the final pressure it shall not interfere with the bolts, but shall simply lift the loose follower or lashing-plate J off from the bolts in the manner shown in Fig. 8.

The opening in the lower plate or frame, L, of each shallow box is of exactly the same size and shape as the interior of the deep boxes, if viewed in plan. The loose followers J J and the finishing-follower B' are just enough smaller than this opening to pass easily therethrough.

Each of the shallow boxes is locked fast in each of the two opposite positions over the respective rams by means of suitable bolts or catches. The top plate, K, of each box is formed with laterally-projecting arms $p\ p$ on opposite sides. As the box is swung into position over either ram the advancing arm first wipes under and lifts a beveled catch or latch, $q$, and upon reaching the correct position abuts against a bolt, $r$, on the opposite side of the head of the press, and at the same instant the end of the other arm $p$ passes from under the latch $q$, and the latter springs back and holds the box in position, preventing its rebound. The box is then held firmly in place by the opposite ends of its arms $p p$ being confined between the two latches $q$ and $r$, as shown in Fig. 6. When it is desired to swing the box away from the ram, the bolt $r$ is raised by means of a lever, $s$, above it. (See Fig. 3.)

I will now explain the operation of the press.

The cotton or other loose material is first filled into one of the long boxes while it is turned outwardly—for example, in the box G, at the extreme right hand in Fig. 1. The boxes G G are then turned on their common axis until the full box is brought over the long-stroke ram A. At the same time an empty shallow box—for example, the box H' in Fig. 1—is locked in position directly over this ram, and the side doors, I I, are closed and locked. Water is then turned on to the ram A, and it ascends, forcing the loose follower J up through the deep box G and compressing the cotton into the shallow box. When the follower J is thus raised to the proper height, the attendant throws in the bolts Q Q, and thereby locks it into the shallow box. The doors I I are unlocked as soon as the ram A reaches its highest position—an operation which may, if desired, be performed automatically. The doors are then thrown open and the lashings are passed around the bale. This lashing is usually done while the shallow box is standing over the preparatory ram, so that the men have plenty of room for pulling through the lashings without getting into the way of the men who are working over the finishing-rams.

The lashings having been placed around the partly-pressed bale, and the ram A having fallen very slightly—enough to clear the bottom of the shallow-box—the stop-bolt $r$ is raised, and the men push the box H' around, swinging it over the finishing-rams. The latter then ascend, the follower B' rising under the loose follower J, and forcing the latter up against the bale, thereby giving the latter its final pressure. The finishing-ram remains in this position for a moment while the men draw the lashings tight around the bale and make their ends fast in the usual way, whereupon the ram descends, the end easing-door, N, is unfastened, thereby relieving the bale of end pressure, and the bale is tumbled out of the press. As the finishing-ram descends, the loose follower J descends with it until again caught by the bolts Q Q. As soon as the follower B' has descended low enough to clear the box the latter may be swung out on the opposite side, (to the position occupied by the box H² in Fig. 2,) where it will stand empty for a moment, while the previous box of its own set is in position over the ram A. As soon as the previous box has been moved out of the way the box H' will be turned another quarter of a revolution, standing once more over the ram A. At this instant the deep box G, just beneath it, is empty and the ram A is elevated with its follower *a* at the top thereof. The attendant then withdraws the bolts Q Q, and the loose follower J drops an inch or so onto the follower *a*, whereupon the ram A is lowered away to the bottom of its stroke, the follower J being arrested by the ledges *g g* at the bottom end of the box. The pair of boxes G G is then turned a half-revolution, thereby bringing the empty box again into the filling position. The workman on the lower level then opens the door *b*, spreads a baling-cloth on the top of the follower, and the box is refilled with loose cotton.

We have thus traced the course of one charge of cotton during its formation into a bale, and have seen how the loose follower J circulates from the bottom of one deep box into one of the shallow boxes, is carried around therewith, and returns into the other one of the deep boxes. If two deep boxes G G are used, the same follower will enter them alternately. If more than two boxes G G are used, the same follower will enter them successively. Whenever a full box G is brought into position over the ram A, the latter is run up, as described, and upon the shooting of the bolts Q Q beneath follower J the ram is dropped back just enough to clear the shallow box. It then stands in this position, during which time the other box G is being filled, until the shallow box into which it has delivered the bale of cotton and the loose follower is swung out, and until the other shallow box is swung into place over it and drops its loose follower upon the follower *a* of the ram. The ram then descends, lowering the loose follower with it. During the time that the lashings are being passed around one partly-formed bale the other or empty box of the same pair is waiting, and as soon as the full box is turned out of the way the empty box is swung into place over the long-stroke ram, its loose follower is dropped onto the follower of the ram, and the side doors are closed and fastened. During the time that this shallow box is retained in this position the other or full box is swung over the finishing-ram, its bale is finished and tumbled out, and it is moved around to the position of waiting.

Although I have described the operations performed in the revolving boxes belonging to only one side of the machine, it will nevertheless be understood that the same operations are also being performed in the boxes on the other side. The finishing-ram receives bales to be given their final pressure alternately from the two opposite preparatory apparatus, being thus kept in almost incessant operation and utilized to its full capacity. In this machine the operations of the several rams are so timed that the water-supply from the pumps is utilized almost without interruption, since only one ram is rising at a time, and since as soon as one ram completes its ascent the water is turned directly to one of the other rams. For example, let us assume that the right-hand long-stroke ram is rising. As soon as it stops the ram B commences to rise. As soon as it stops water is turned to the left-hand long-stroke ram, and by the time this completes its stroke the ram B has fallen and is ready for the next stroke, and by the time this is completed the water is turned to the long-stroke ram A again, and so on.

It is not essential that the operation of passing the lashings around the partly-compressed bale be performed while the shallow box containing it is standing over the preparatory ram, as already described, since this lashing may be done after the box is swung out. In this case the box will be moved out at right angles, where it will stand while the lashings are being applied.

One of the most important advantages of my invention is that by it the stroke of the finishing-rams is considerably shortened. Formerly the finishing-rams had to move up the thickness of the bottom frame of the shallow box before their follower encountered the bale, whereas now their follower at once encounters the loose follower J, thus saving in practice about nine inches in stroke. The time heretofore taken by the slow-moving rams in rising and falling this distance is saved by my present construction, with a corresponding saving of water.

An essential generic feature of my present invention is the construction or combination by means of which I am enabled to lash the partly-formed bale after the shallow box containing it has been released from the pressure of the preparatory ram.

It is by no means essential to this feature of my invention that two independently-pivoted shallow boxes be used in connection with each pair or set of deep boxes, since the shallow boxes may be more than two in number, and may be connected rigidly together, if desired. I have designed a press having one set of deep boxes and having three shallow boxes fixed rigidly together and radiating equidistantly from their pivotal axis, the long-stroke and short-stroke rams being arranged correspondingly in planes one hundred and twenty degrees apart, so that while one of the three shallow boxes is over the long-stroke ram the second is standing out in position for the lashing of its bale, and the third is standing over the short-stroke ram. This construction of press is fully illustrated and described in another application for patent executed by me simultaneously herewith, (filed May 16, 1887, Serial No. 238,303,) and to which reference is made for a full understanding of it. I regard this construction as a modification embodying the generic features of my present invention.

I will now describe a feature of my invention whereby the same press is adapted for pressing bales of different sizes or weights.

In the operation of a cotton-press there is occasionally demand for the pressing of a bale of greater weight than those for which the press is ordinarily used. I have so constructed my improved press that it may be instantly converted from a press for pressing bales of standard weight to one for pressing bales of excessive weight. Each of the shallow boxes is provided, as already stated, with a top lashing-plate, P, distinct from the top plate, K. The top plate, K, has a rectangular opening formed in it extending through its center, as shown at o in Figs. 4, 6, 7, 8, and 9. The lower portion of this opening is contracted, and into it projects a longitudinal rib, t, which is formed on the top of the lashing-plate P. A cap-plate, u, is placed in the opening o, completely filling the upper and wider portion thereof, and being fastened to the rib t by screws or otherwise, as shown. Thus the plate P is upheld in the manner shown in Fig. 6, being suspended from the cap-plate or head u, the overhanging sides of which rest upon the ledges v v, formed by the contraction of the opening o. Between the bottom of the top plate, K, and the top of the lashing-plate P there is a space equal in height to the difference in size when under the pressure of the long-stroke ram between the lighter and heavier bales that are to be pressed. This space is filled by means of two longitudinal filling-pieces or chocks, R R, on opposite sides of the rib t, as best shown in Figs. 6 to 8. So long as these filling-pieces are in place the lashing-plate P forms a solid top for the box, and the press is in condition for pressing bales of the lesser weight. When it is desired to press heavier bales, the filling-pieces R R are withdrawn, leaving the space above the plate P open. For this purpose the filling-pieces R R are provided with holes w w, formed through them horizontally, and studs W W are fixed in line with these holes, being supported on brackets T T. The filling-pieces R R have handles S S, Fig. 4, by pulling on which they may be drawn out laterally and will be held on the studs W W, as shown in Fig. 9. In the forming of the heavier bale a greater quantity of cotton than usual is forced by the preparatory ram up into the shallow box, and the compressed mass of cotton lifts the lashing-plate P until it abuts directly against the plate K, as shown in Fig. 9. When the shallow box is swung over the finishing-ram, the latter then imparts the final pressure to the bale, but does not force the same into as small a compass as in the first instance, the difference at a like density being equal to the vertical thickness of the filling-pieces R R, as will be apparent upon a comparison of Figs. 8 and 9. Upon the descent of the finishing-ram the plate P falls with the bale until arrested by the head-plate u.

Fig. 12 shows a construction of press wherein the feature of my invention last described is omitted. The top plate, K, of the shallow box constitutes the top lashing-plate, being formed with transverse grooves on its under side. This view also shows some slight modifications in details of construction, which, however, are not essential, and need not be described. The end casing-plates, N, are constructed to hook over the projections on the ends of the bottom plates, L, in the same manner as in my said 1884 patent.

It will be understood that a press may be constructed according to my present invention with only one set of deep boxes and one set of shallow boxes, instead of with two sets of deep and shallow boxes, if preferred.

What I claim, and desire to secure by Letters Patent, is, in a baling-press, the following defined novel features or combinations, substantially as hereinbefore specified, namely:

1. The combination of the preparatory ram and the finishing-ram, a deep box for holding the loose material for the action of the preparatory ram, a rotative shallow box adapted to be swung from the position in line with the preparatory ram to the position in line with the finishing-ram, and constructed with open sides and with a bottom opening, doors for closing the sides of said box, a loose follower or lashing-plate fitting loosely within said deep box, and adapted to enter the bottom opening in said shallow box, and suitable means for fastening said follower in said shallow box as a false bottom therefor, whereby when a partly-formed bale has been pressed into the shallow box it may be lashed after being released from the pressure of the preliminary ram and before being swung over the finishing-ram.

2. The combination of the preparatory ram and the finishing-ram, a set of revolving deep boxes arranged to be brought into coincidence successively with the preparatory ram, a rotative shallow box adapted to be swung from the position in line with the preparatory ram to the position in line with the finishing-ram, and constructed with open sides and with a bottom opening, two doors mounted on a stationary part and adapted to close the sides of said box when the latter is in position over the preparatory ram, loose followers or lashing-plates fitting freely within said deep boxes and adapted to enter the bottom opening in said shallow box, and locking mechanism for fastening said follower in said shallow box as a false bottom therefor, whereby said follower circulates from the deep into the shallow box, and vice versa.

3. The combination of the preparatory ram and the finishing-ram, a set of revolving deep boxes arranged to be brought into coincidence successively with the preparatory ram, a set of rotative shallow boxes each adapted to be swung from the position in line with the preparatory ram to the position in line with the finishing-ram, and constructed with open sides and with a bottom opening, doors for closing the sides of said boxes, and loose followers or lashing-plates fitting freely within said deep boxes and adapted to enter the bottom openings in said shallow boxes, and locking mechanism for fastening said followers in said shallow boxes as false bottoms therefor, whereby a partly-pressed bale may be lashed in one of the shallow boxes after being released from the pressure of the preparatory ram and before it is turned into position over the finishing-ram and while the other shallow box is in position over the finishing-ram.

4. The combination of the preparatory ram and the finishing-ram, a set of revolving deep boxes arranged to be brought into coincidence successively with the preparatory ram, a set of two rotative shallow boxes each adapted to receive and hold a partly-pressed bale, both pivoted on the same axis and constructed to be swung independently of one another from the position in line with the preparatory ram to the position in line with the finishing-ram, and doors for closing the sides of said boxes.

5. The combination of the preparatory ram and the finishing-ram, a set of revolving deep boxes arranged to be brought into coincidence successively with the preparatory ram, a set of two rotative shallow boxes, both pivoted on the same axis and each adapted to be swung independently of the other from the position in line with the preparatory ram to the position in line with the finishing-ram, doors for closing the sides of said boxes, loose followers or lashing-plates fitting freely within said deep boxes and adapted to enter the bottoms of said shallow boxes, and locking mechanism for fastening said followers in said shallow boxes as false bottoms therefor.

6. The combination of two preparatory rams, a finishing-ram between them, two sets of revolving deep boxes, the boxes of each set arranged to be brought successively into coincidence with their respective preparatory ram, two sets of rotative shallow boxes, each box adapted to be swung from a position in line with one of the preparatory rams to the position in line with the finishing-ram, two pairs of doors for closing the sides of said boxes, loose followers or lashing-plates fitting freely within said deep boxes and adapted to enter the bottoms of said shallow boxes, and locking mechanisms for fastening said followers in said shallow boxes as false bottoms thereof.

7. In a baling-press, a revolving box constructed of a top plate, a bottom plate having an opening through it, an end plate fixed between said plates at the inner or pivotal end, tie-bolts for connecting together the outer ends of said plates, and an easing-door closing the outer end thereof.

8. In a baling-press, a revolving box constructed of a top plate, a bottom plate having an opening through it, an end plate fixed between said plates at the inner or pivotal end, and an easing-door closing the outer end thereof, in combination with a loose follower or lashing-plate fitting in said opening, and a locking mechanism for retaining said follower in place therein.

9. In a baling-press, the combination of a revolving shallow box, H, with a loose follower fitting into the bottom thereof, and a locking mechanism therefor, consisting of laterally-moving bolts on opposite sides of said box, two rock-shafts having arms engaging said bolts, and connections between said shafts for moving said bolts simultaneously.

10. In a baling-press, the combination, with the deep box and preparatory and finishing rams, of a revolving shallow box consisting of an open frame, a top lashing-plate hung in said frame, and means for retaining the same at different distances below the top of the frame, whereby the box is made adjustable to different depths in order to press bales of different sizes.

11. In a baling-press, a revolving box consisting of an open frame, combined with a top lashing-plate hung from the top thereof with an intervening space, and a removable filling-piece for filling said space, whereby on removing said filling-piece the box is given a greater depth and is adapted for the pressing of larger bales.

12. In a baling-press, a revolving box consisting of a top plate, a bottom plate, and ends, combined with a top lashing-plate hung from said top plate and capable of being raised or lowered, two filling-pieces adapted to enter between them on opposite sides, and studs for supporting said pieces when drawn out.

In witness whereof I have hereunto signed my name in the presence of two subscribing witnesses.

JAMES WATSON.

Witnesses:
ARTHUR C. FRASER,
GEORGE H. FRASER.